(12) United States Patent
Chandrachari et al.

(10) Patent No.: US 8,621,461 B1
(45) Date of Patent: Dec. 31, 2013

(54) VIRTUAL MACHINE BASED OPERATING SYSTEM SIMULATION USING HOST RAM-BASED EMULATION OF PERSISTENT MASS STORAGE DEVICE

(75) Inventors: Aravinda Chandrachari, Bangalore (IN); Madhan Rajasekkharan, Bangalore (IN); Rakshit Karnawat, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 222 days.

(21) Appl. No.: 12/951,945

(22) Filed: Nov. 22, 2010

(51) Int. Cl.
*G06F 9/455* (2006.01)
(52) U.S. Cl.
USPC ............................................................. 718/1
(58) Field of Classification Search
None
See application file for complete search history.

(56) References Cited

U.S. PATENT DOCUMENTS

| | | | |
|---|---|---|---|
| 2006/0080522 A1* | 4/2006 | Button et al. | 713/2 |
| 2008/0148300 A1* | 6/2008 | Archer et al. | 719/330 |
| 2009/0089781 A1* | 4/2009 | Shingai et al. | 718/1 |
| 2009/0210875 A1* | 8/2009 | Bolles et al. | 718/1 |
| 2010/0281477 A1* | 11/2010 | Berlin | 718/1 |
| 2010/0332889 A1* | 12/2010 | Shneorson et al. | 714/2 |
| 2012/0124355 A1* | 5/2012 | Patro et al. | 713/2 |

* cited by examiner

*Primary Examiner* — Emerson Puente
*Assistant Examiner* — Dong Kim
(74) *Attorney, Agent, or Firm* — Perkins Coie LLP

(57) ABSTRACT

A virtual storage device of a virtual machine is stored onto a host based RAM drive to achieve performance gains. The virtual machine can be a virtual storage server or a simulated storage server. The disclosed technique can include using the host based RAM drive to store a data image file that represents a virtual disk based emulation of an NVRAM of a storage server. A network server is used to provide persistence across host reboots and to allow virtual machines to be moved between hosts.

22 Claims, 10 Drawing Sheets

VIRTUAL MACHINE BASED OPERATING SYSTEM SIMULATION USING HOST RAM-BASED EMULATION OF PERSISTENT MASS STORAGE DEVICE

FIELD OF THE INVENTION

At least one embodiment of the present invention pertains to virtual machine based operating system simulation, and more particularly, to RAM-based emulation of a persistent mass storage device in virtual machine based operating system simulation.

BACKGROUND

Virtualization is a technique commonly used to improve the performance and utilization of multi-core/multi-processor computer systems. In a virtualization environment, multiple virtual machines (VMs) can share the same physical hardware, such as processors/cores, memory and input/output (I/O) devices. A software layer called a hypervisor typically provides the virtualization, i.e., virtualization of physical processors, memory and peripheral devices. A hypervisor can be a Type-1 hypervisor, which runs on top of a host operating system, or a Type-2 hypervisor which runs directly on top of the hardware.

Virtualization may be desirable for any of various purposes. For example, it may be used to allow relatively low-cost hardware in conjunction with special-purpose software to be used to emulate a more expensive, special-purpose hardware system. Also, virtualization enables the sharing of hardware by multiple independent VMs. In addition, a VM can have an architecture that differs from that of the physical platform in which is implemented.

One application in which virtualization can be useful is network storage. Network storage is a common approach to backing up data, making large amounts of data accessible to multiple users, and other purposes. In a network storage environment, a storage server makes data available to client (host) systems by presenting or exporting to the clients one or more logical containers of data. There are various forms of network storage, including network attached storage (NAS) and storage area network (SAN). In a NAS context, a storage server services file-level requests from clients, whereas in a SAN context a storage server services block-level requests. Some storage servers are capable of servicing both file-level requests and block-level requests. By using virtualization, relatively low-cost generic computer hardware with appropriate software can be used instead of a relatively complex, expensive, special-purpose storage server. The result is a virtual storage server implemented on relatively generic computer hardware.

Another use for virtualization is to simulate a storage server, such as for development or testing. This can also be done in the context of network storage. One network storage manufacturer is known to provide such a simulator for a storage operating system used in its storage server products. The simulator is implemented as a VM, i.e., as a guest operating system, that runs on a VM provided by the VMware® Server. The virtual disks for the VM are stored as data image files (e.g., .vmdk files) on a physical disk attached to the host system, by using a file system provided by the host operating system. A "host system," as the term is used herein, refers to a physical processing system or device, such as a computer. A "file", as used herein, is any logical container of data.

To support the ability to move the simulator from one host system to another, the data image files of the simulator are stored on a network file system (NFS) server that is coupled to all participating host systems. With storage operating system disks being simulated as files on these virtual disks seen by the guest operating system, each disk input/output (I/O) operation on the simulated disks results in propagation of the I/O operation from a guest OS Filesystem I/O to a Guest OS disk I/O, and then to a host OS NFS I/O. This multi-step sequence adds significant overhead to the storage OS disk I/O operations because of the involvement of NFS and networking overheads.

It is also known in the art to use non-volatile random access memory (NVRAM) in the form of battery-backed RAM in certain storage servers to improve performance or increase reliability. For example, certain storage servers maintain in NVRAM a log of write requests received from clients. This log is sometimes referred to as the "NVLog". The NVLog includes a separate entry for each write request received from a client since the last time accumulated client writes were flushed to disk (an event sometimes called a "consistency point"). Generally, the NVLog is only used in the event of a failure, i.e., to recover writes that would otherwise be lost. In the event of a failure, it may be possible to replay the NVLog to reconstruct the current state of stored data just prior to the failure. After each consistency point is completed, the NVLog is cleared and started anew.

However, implementing an NVRAM in a virtual storage server or in a simulator for a storage operating system is problematic. Since a virtual storage server is not a physical entity, it normally has to work with an emulated NVRAM backed by a physical storage device, such as a disk. Any client write to the virtual storage server therefore ends up writing to disk. Since a disk has substantially lower throughput and higher (and less predictable) latency than RAM, this sort of emulation can have a significant adverse effect on the performance of a virtual storage server or a simulator of a storage operating system. If a NAS protocol such as NFS is used to access such disk(s), that increases the latency even further.

SUMMARY

This summary is provided to introduce in a simplified form certain concepts that are further described in the Detailed Description below. This summary is not intended to identify essential features of the claimed subject matter or to limit the scope of the claimed subject matter.

The technique introduced here in one embodiment includes storing, on a host based RAM drive, such as a RAM disk, the data image file(s) that represent one or more virtual, secondary, persistent storage devices of a VM, to achieve performance gains. Any I/O (read/write) to the RAM drive results in an I/O to the RAM. A "RAM drive" is a portion of physical RAM that is partitioned and configured by the host operating system to enable that portion of the RAM to be used just as if it were a persistent secondary storage device (e.g., a disk drive). A "secondary" storage device is a storage device of a host system that is not used as the main working memory of the host system. A disk is a common example of secondary storage.

In certain embodiments, the VM can be a virtual storage server or a simulated storage server. In certain embodiments, the technique further includes using the host based RAM drive to store the data image file(s) that represent a virtual disk based emulation of NVRAM for the VM. Furthermore, the above-mentioned operations are done while preserving persistence across host reboots and while allowing VMs to be moved between hosts.

Other aspects of the technique will be apparent from the accompanying figures and detailed description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
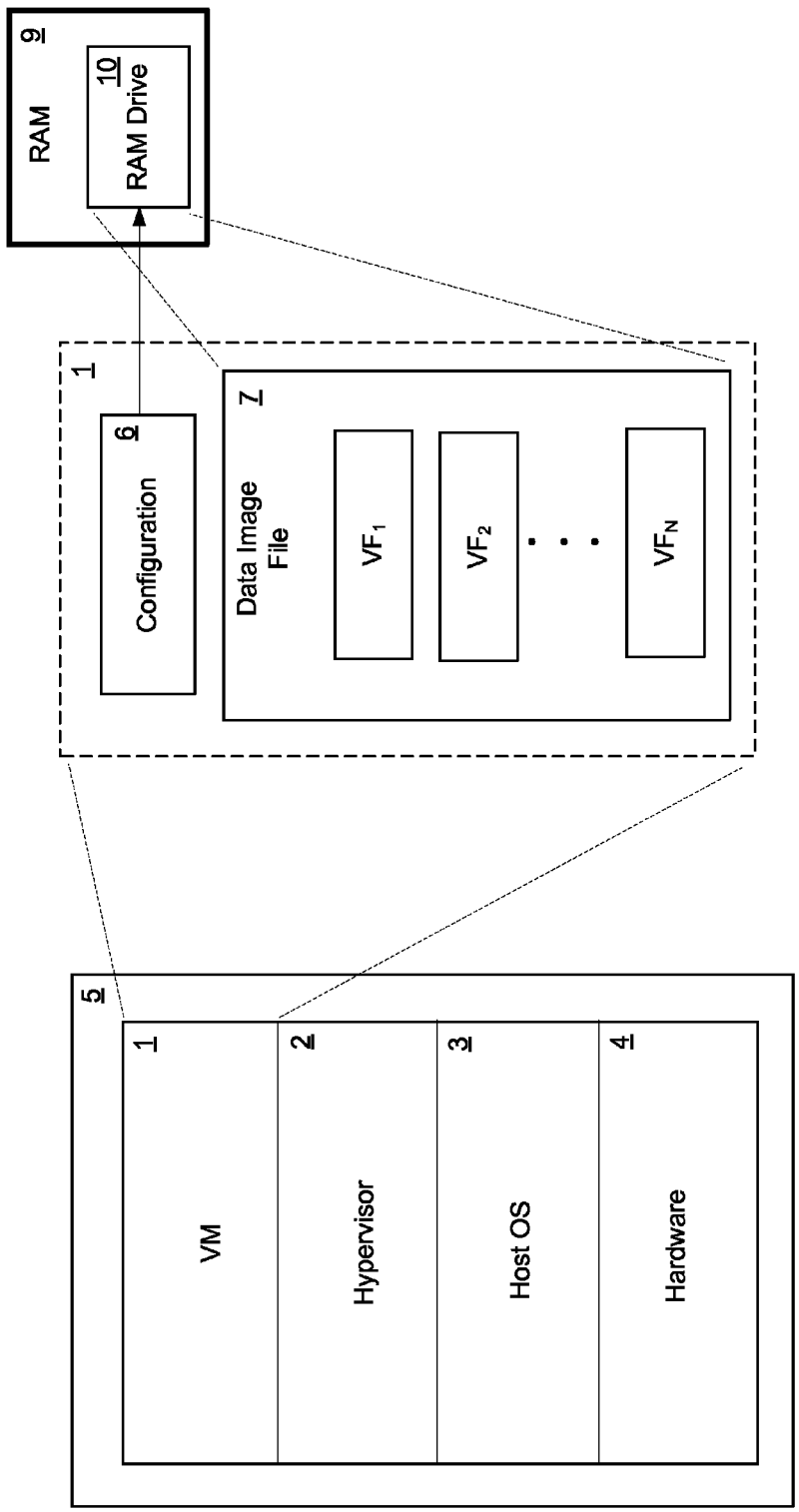
FIG. 1 illustrates a VM represented as a configuration file and a data image file.

As noted above, the technique introduced here in one embodiment includes storing at least some of the virtual storage devices (i.e., the data image files) of a VM onto a host based RAM drive to achieve performance gains. Any I/O to the RAM drive results in a read/write to the RAM, which is typically significantly faster than the I/O to physical disks or to a network. This can be done by modifying the storage I/O paths specified in the corresponding configuration file of the VM to point to a local filesystem created in the appropriate portion of the RAM, instead of pointing to a physical disk of the host or a remote network attached device. The VM can be, for example, a virtual storage server or a simulated storage server. The technique can include using the host based RAM drive to store the data image file(s) that represent a virtual disk-based emulation of NVRAM, where such NVRAM is used to store temporarily, for example, a log (journal) of client write requests. In effect, therefore, this essentially provides two layers of emulation of NVRAM, i.e., 1) RAM based emulation of 2) a virtual (emulated) secondary storage device. Furthermore, the foregoing is done while preserving persistence across host reboots and while allowing VM instances to be moved between hosts.

The technique introduced here can be used, among other purposes, to make a storage server simulator significantly more performance efficient, making it scalable for a variety of new development and testing use cases, and thereby resulting in further savings of engineering costs. Further, the technique can be broadly applicable to improve storage device I/O performance of any guest OS in a VM environment.

Storing virtual storage devices on a RAM drive initially presents two problems, however: First, RAM drives are local to the hosts, which makes moving simulator instances from one host to another difficult. Second, since the RAM drives are implemented in normal (i.e., volatile) RAM, RAM drive contents are not persistent across host system reboots. The proposed solution addresses both these shortcomings, as described below.

In one embodiment, the solution introduced here includes specific computing infrastructure for hosting OS simulators and a mechanism to move virtual storage device files from a RAM drive to a persistent (non-volatile) store on a network server, such as an NFS server, as appropriate. With regard to the infrastructure, at least one RAM drive of sufficient size is created for each VM that runs an OS simulator. (This assumes that the host system has sufficient physical memory. However, given the configuration of modern computers and the low cost of RAM, this is probably a reasonable assumption.) Each of these RAM drives is formatted with a host-provided filesystem, such as LINUX's ext2 filesystem or FreeBSD's ffs filesystem, for example. These formatted RAM drives are then mounted on predefined directories.

Each virtual storage device in the solution introduced here is represented as one or more data image files. To facilitate description, it is noted in certain places in this description that each data image file is or can be a .vmdk file. Note, however, that in other embodiments the data and metadata representing a VM can be stored in a format other than .vmdk, such as .vhd, gcow or gcow2.

When a VM is created for a simulator, the data image files of the simulator are also created and are stored initially in a persistent location. The persistent location can be, for example, a shared directory stored in an NFS server, and in case of customer systems, this can be a disk based host filesystem.

In one embodiment, before a VM is first started, the data image files are copied to the directory mounted on the corresponding RAM drive. The configuration file (e.g., the .vmx file in the case of a VMware environment) of the VM is changed to specify the path of data image files placed in the corresponding RAM drive(s) rather than the path of the data image files in the persistent store on the server. This essentially means that the disks seen and used by the VM are the data image files stored on RAM drive and not the ones stored in the persistent store.

As long as the host system is not restarted, the data image files stored on RAM drives remain persistent, irrespective of whether the VM is started or stopped. To ensure persistency of the data image files across reboots of the host OS, commands are added in the shutdown and startup paths of the host OS (e.g., RC scripts in the case of UNIX based hosts) to copy the .vmdk files from the RAM drive to a persistent store. Commands are also added to ensure the persistence of the vmdk file when the guest VM is stopped.

In general, a physical machine (host) that supports VMs is conceptually split into multiple logical machine slots capable of hosting/running a VM; these slots are called "host slots" herein. For embodiments in which an OS simulator can be moved from one host system to another, the data image files stored in a RAM drive are flushed to the shared NFS directory on the server only when the simulator is unbound/detached from a host slot of a particular host, and then copied to the RAM drive of the new (destination) host system when the simulator is bound/attached to the new host system. The configuration file is updated with the new path of data image files if the directory which mounts the corresponding RAM drive on the new host is different from the previous host. Though this adds an overhead for the unbinding and binding operations mentioned above, because of the need to copy the data image files from and to the shared persistent store, the impact of this overhead is expected to be low, since migrating simulator instances between hosts is not expected to be a frequent occurrence. As used herein, the term "binding" (or variations of it) means associating a VM with a host slot on the physical host and registering the VM on the physical host, so that VM will start running and utilizing the physical resources from that host slot. The term "unbinding" (or variations of it) means disassociating a VM from a host slot.

As illustrated in FIG. 1, a host system 5 (i.e., a physical processing system) includes a set of layers, including at the lowest level a hardware layer 4, a host OS 3 which operates logically on top of the hardware layer 4, a hypervisor 2 which operates logically on top of the host OS 3, and a VM 1 which operates on top of the hypervisor 2.

As is commonly the case, the illustrated virtualization environment represents the VM as a group of files including at least two types of files, a configuration file 6 and at least one data image file 7. Although only one configuration file 6 and only one data image file 7 are shown, note that a VM may be represented by two or more configuration files and/or two or more data image files. The configuration file 6 contains the configuration (settings) of the VM 1. Each data image file 7 contains data contained within the VM 1 and itself can include numerous individual files, $VF_1, VF_2, \ldots, VF_N$. The configuration file 6 and the data image file 7 are formatted according to the particular virtualization environment being used. For example, in the case of a VMware environment the configuration file 6 may be a .vmx file and a data image file 7 may be a .vmdk file.

In a conventional virtualized system, the configuration file 6 would normally specify one or more paths pointing to one or more physical disks of the host system. In accordance with the technique introduced here, however, the storage I/O paths specified in the configuration file 6 of a VM are set to point to that portion 10, designated as a RAM drive, of RAM 9 on the host system, instead of pointing to a physical disk of the host.

Figure 2:
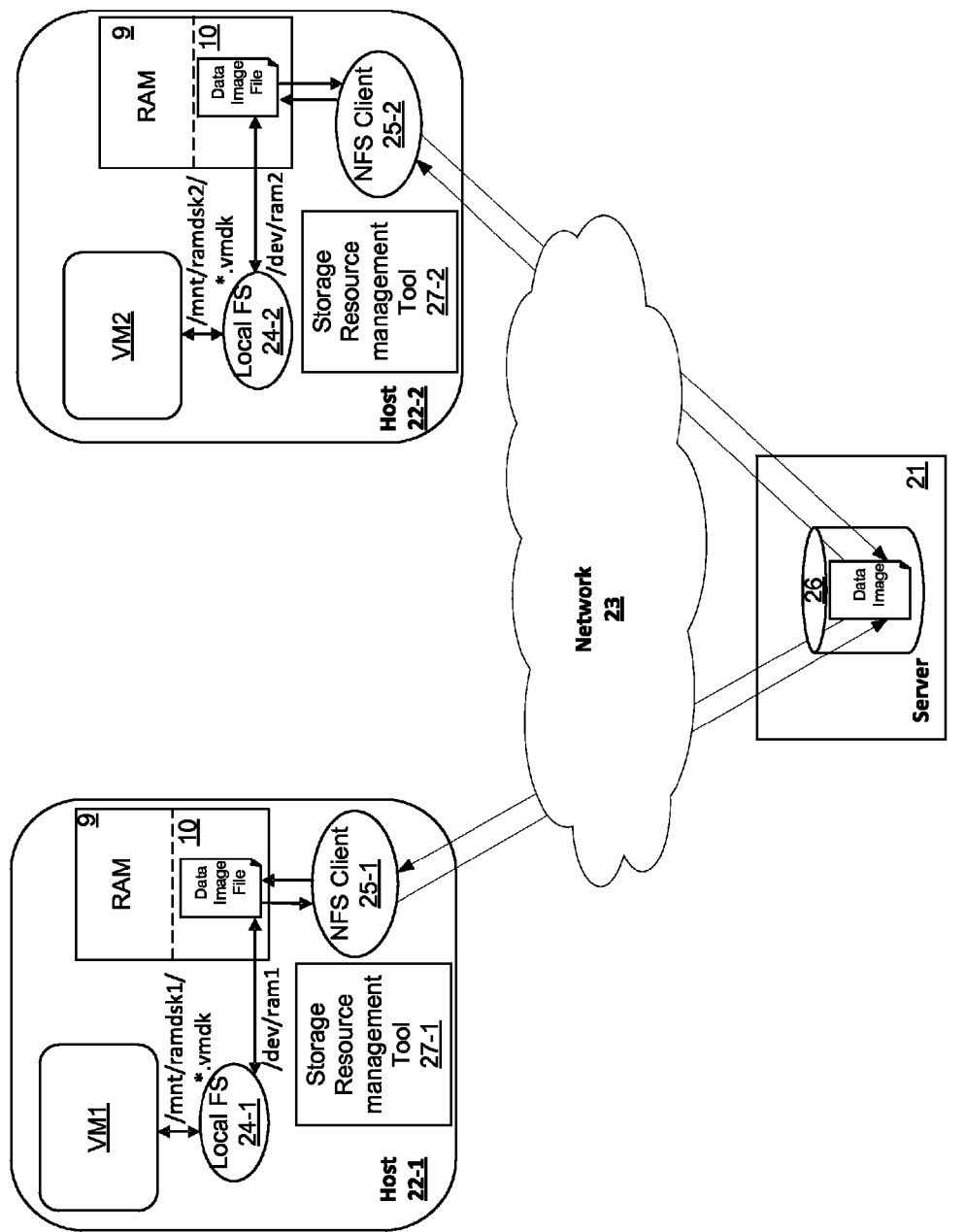
FIG. 2 illustrates a network environment in which can be implemented a technique of using RAM drives to store VM disk files.

FIG. 2 illustrates conceptually a network environment in which the technique introduced here can be implemented. A server 21 and at least two physical host systems, host 22-1 and host 22-2, are each coupled to a network 23. Each of the server 21 and the host systems 22-1, 22-2 can be, for example, a conventional personal computer (PC), server-class computer, workstation, handheld computing/communication device, or the like. The network 23 can be, for example, a local area network (LAN), wide area network (WAN), metropolitan area network (MAN), global area network (GAN) (e.g., the Internet), a Fibre Channel fabric, or a combination of one or more of these types of interconnects.

Hosts 22-1 and 22-2 each include a VM instance, VM1 and VM2, respectively. VM1 and VM2 each communicate through a local filesystem (FS) 24-1 or 24-2, respectively, with a portion 10 of the host's RAM 9 configured to operate as a RAM drive. A "filesystem", as the term is used herein, is any structured set of logical containers of data maintained by processing system, where the data containers may be, but are not necessarily, in the form of files, directories, logical units (LUNs) and/or other common type(s) of logical containers. During normal operation of a VM, one or more of the data image files of the VM are stored in the (portion of the RAM configured as a) RAM drive; these may include, for example, the data image file(s) used to emulate NVRAM (including a log of client write requests). By virtue of appropriately modifying the storage I/O paths specified in the VM's configuration file, any storage-related I/O sent by a VM for such data image file(s) will be directed to the filesystem in the local RAM drive.

Hosts 22-1 and 22-2 each also include an NFS client 25-1, 25-2, respectively, to communicate via NFS with the server. The server 21 contains a persistent store 26, which includes an NFS directory shared by all participating hosts (e.g., Host 22-1 and Host 22-2), which is used to store data image files to maintain persistence across host OS shutdowns/reboots, VM shutdowns/reboots and inter-host VM migrations. The server 21 is used initially to install the data image files from the persistent store 26 in the server 21 to a RAM drive 10 on a host system, and subsequently when necessary, such as to save the contents of a RAM drive back to the persistent store 26 on the server 21 (e.g., in the case of a host or VM reboot or when moving a VM to another host).

In one embodiment, each VM instance, VM1 or VM2, is a virtual storage server or a storage OS simulator, and each such VM maintains at least one data image file in a local RAM drive of its host system to store the contents of emulated NVRAM, which the VM may use to maintain a log of client write requests.

In one embodiment, before a VM is first started, its data image files are copied to the directory mounted on the corresponding RAM drive. For example, in FIG. 2, the data image (e.g., .vmdk) files for VM1 are stored at mount point /mnt/ramdisk1/, whereas the data image files for VM2 are stored at mount point /mnt/ramdisk2/. In the example of FIG. 2, /dev/ram1 represents the path, used by the local filesystem, to the driver for RAM disk "ram1," while dev/ram2 represents the path used by the local filesystem to the driver for RAM disk "ram2".

Note that the term "RAM disk" is used here only for the purpose of illustration; that is, RAM can also be configured in a similar manner to emulate essentially any form of persistent mass storage device, not just a disk. Therefore, the more general term "RAM drive" is used elsewhere in this description to denote that fact. In general, wherever the term "disk" is used in this description, it should be understood that essentially any other form of persistent mass storage device could be substituted. Also, note that while each RAM drive is illustrated as containing only one data image file in FIG. 2, in practice each RAM drive can actually contain two or more data image files.

Figure 3A:
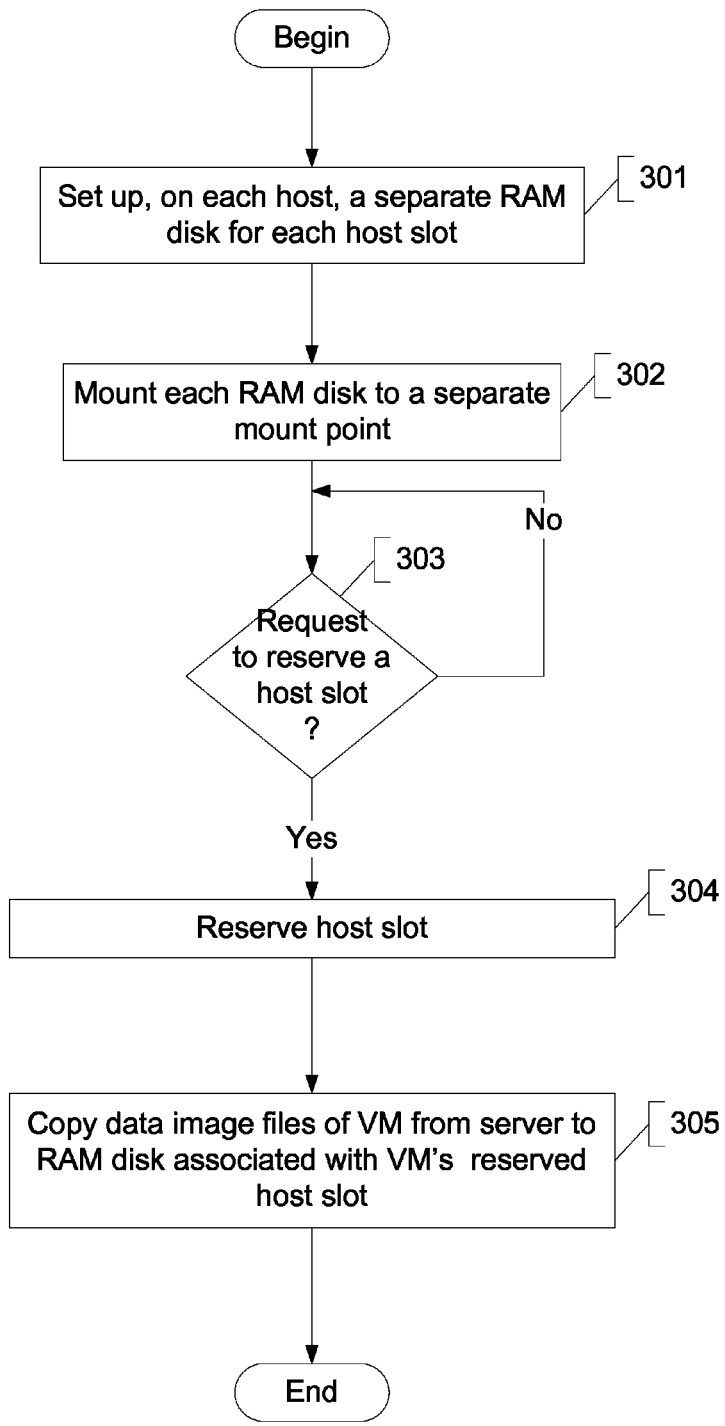
FIG. 3A illustrates a process of setting up a RAM disk for a VM.

FIGS. 3A through 3F illustrate examples of various processes associated with the technique introduced here, according to at least one embodiment. Referring first to FIG. 3A, a process of setting up a RAM disk for a VM is illustrated. Initially, at step 301 on each host system a separate RAM disk is set up for each host slot that the host has. This is generally an one-time step executed as part of the VM infrastructure setup by an administrator. Host operating systems generally provide command to create a pseudo device (drive) that represents a portion of RAM. Such a command can be used to create a RAM disk of size sufficient to hold the virtual disk files. A host operating system command to create a filesystem is then used to create a local filesystem in each such RAM disk.

Next, at step 302 each RAM disk is mounted to a separate mount point. In one embodiment this involves creating a separate mount point directory for each host slot that the host is configured to have, and then mounting each of the RAM drives created in step 301 on the corresponding mount point. If and when a request to reserve a host slot is received (step 303; e.g., from a human user), then in response a host slot is reserved at step 304. This can be done using a conventional storage resource management tool configured to manage virtual storage servers. Next, at step 305 the data image files of a VM are copied from the server to the RAM disk associated with the host slot reserved for the VM. This can be done by using any conventional tool for remote copying of data.

Figure 3B:
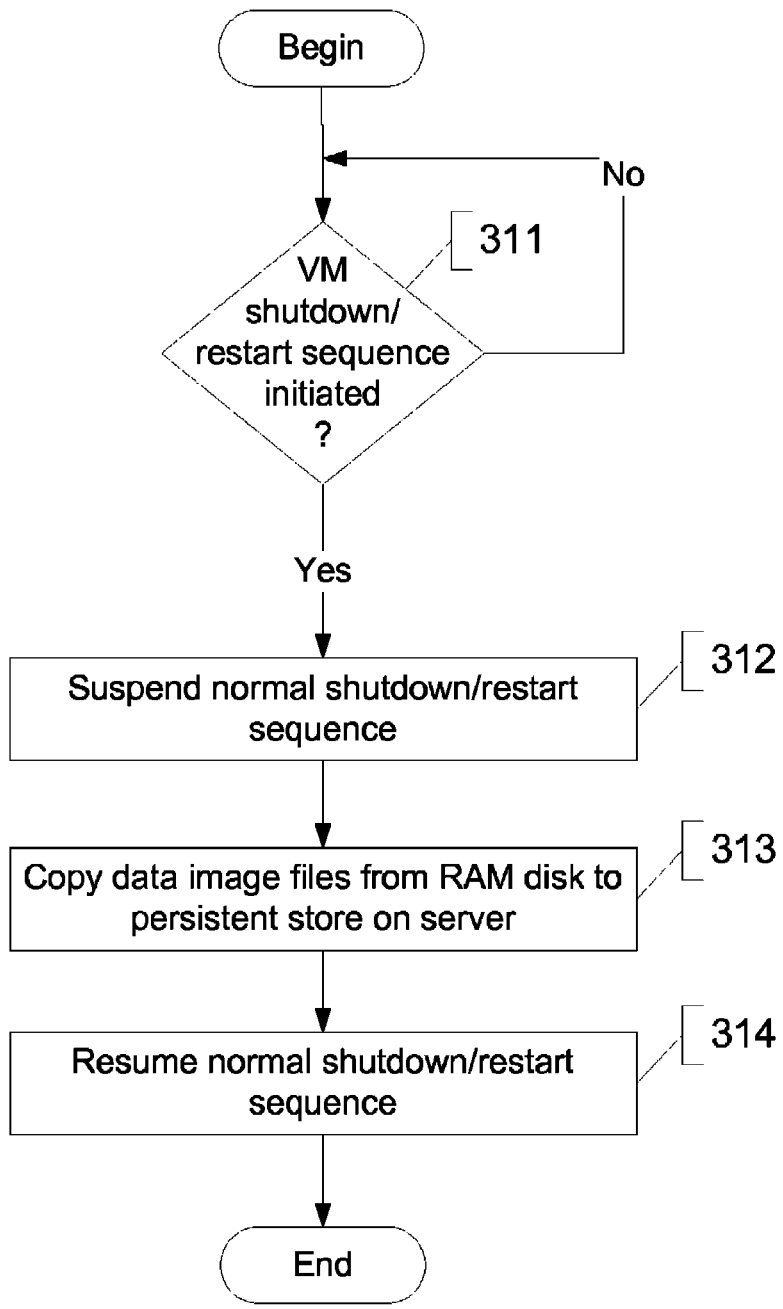
FIGS. 3B and 3C illustrates a process of maintaining persistence across a shutdown/restart of a VM.
Figure 3C:
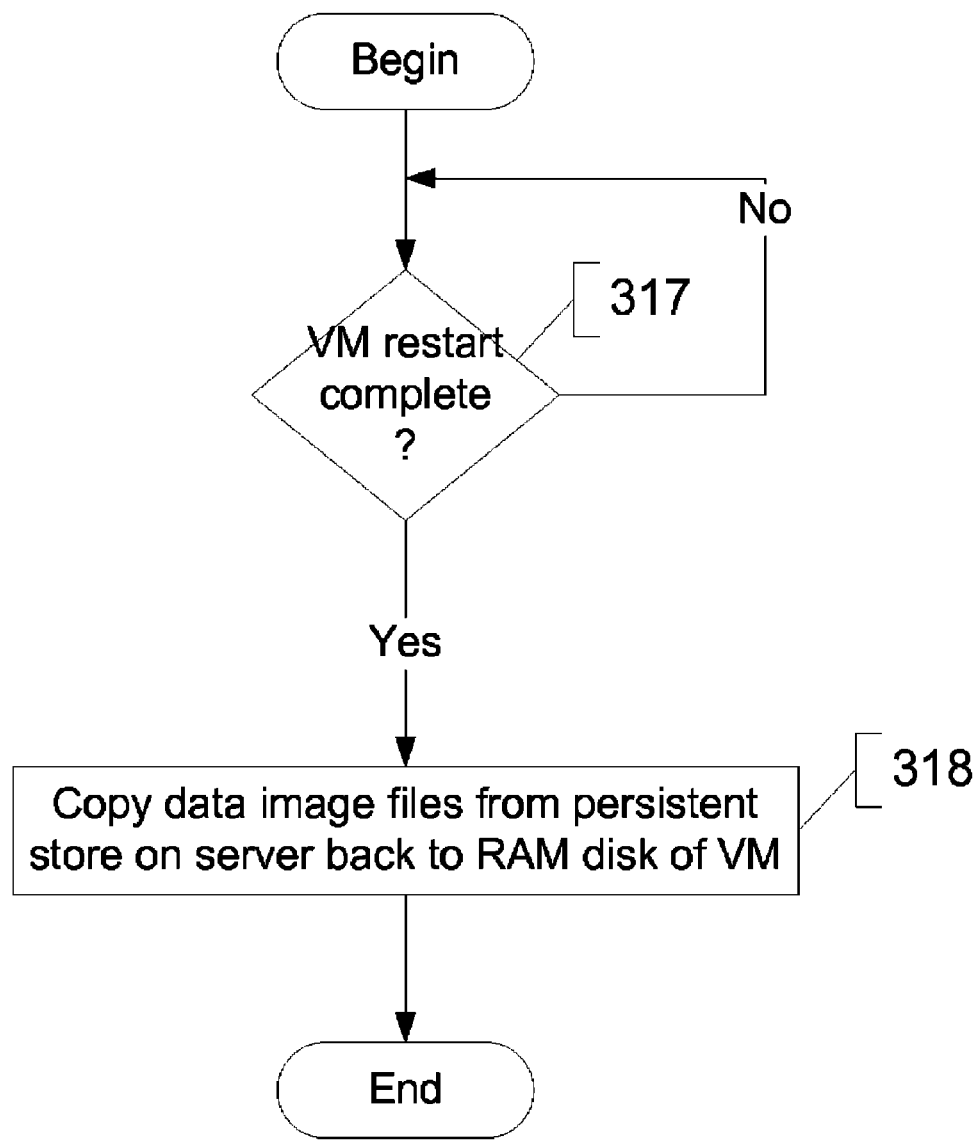

The technique introduced here provides persistence in the event of a VM shutdown or restart. FIG. 3B illustrates a process for accomplishing this. These steps may be implemented as modifications to the normal shutdown and restart processes of the VM instance. In response to detecting initiation of a VM shutdown or restart sequence (step 311), the normal shutdown/restart sequence of the VM is suspended at step 312. Then, at step 313 the data image files of the VM are copied from RAM disk to the persistent store on the server, e.g., by using NFS. Copying of data between RAM disk and the server can be done by using any conventional remote copying tool. Once the copying is complete, the normal shutdown sequence is resumed at step. If and when a restart of the VM has been completed (step 317), the data image files are copied back from the server to the RAM disk associated with that VM at step 318, as shown in FIG. 3C.

Figure 3D:
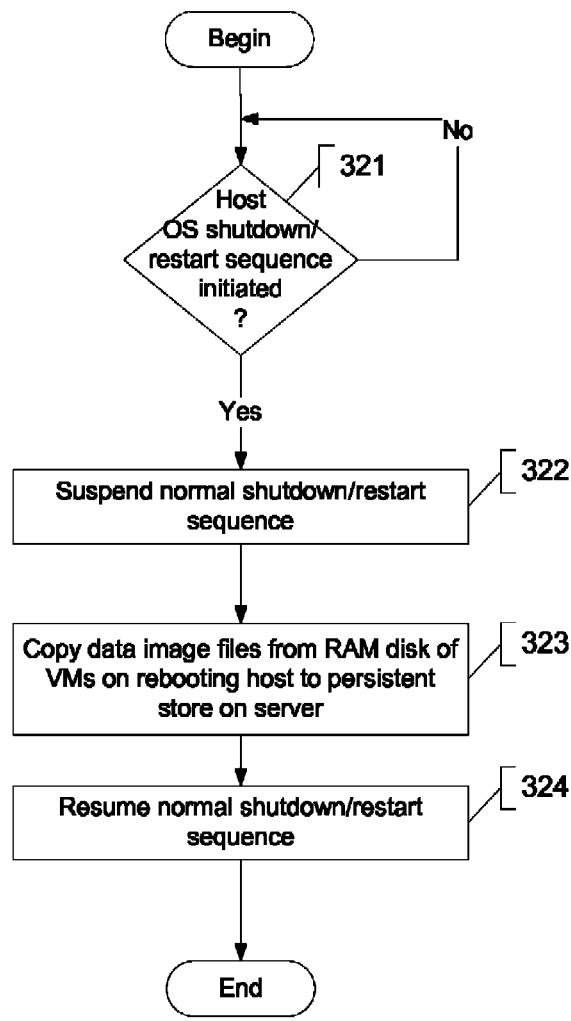
FIGS. 3D and 3E illustrate a process of maintaining persistence across a shutdown/restart of a host operating system.
Figure 3E:
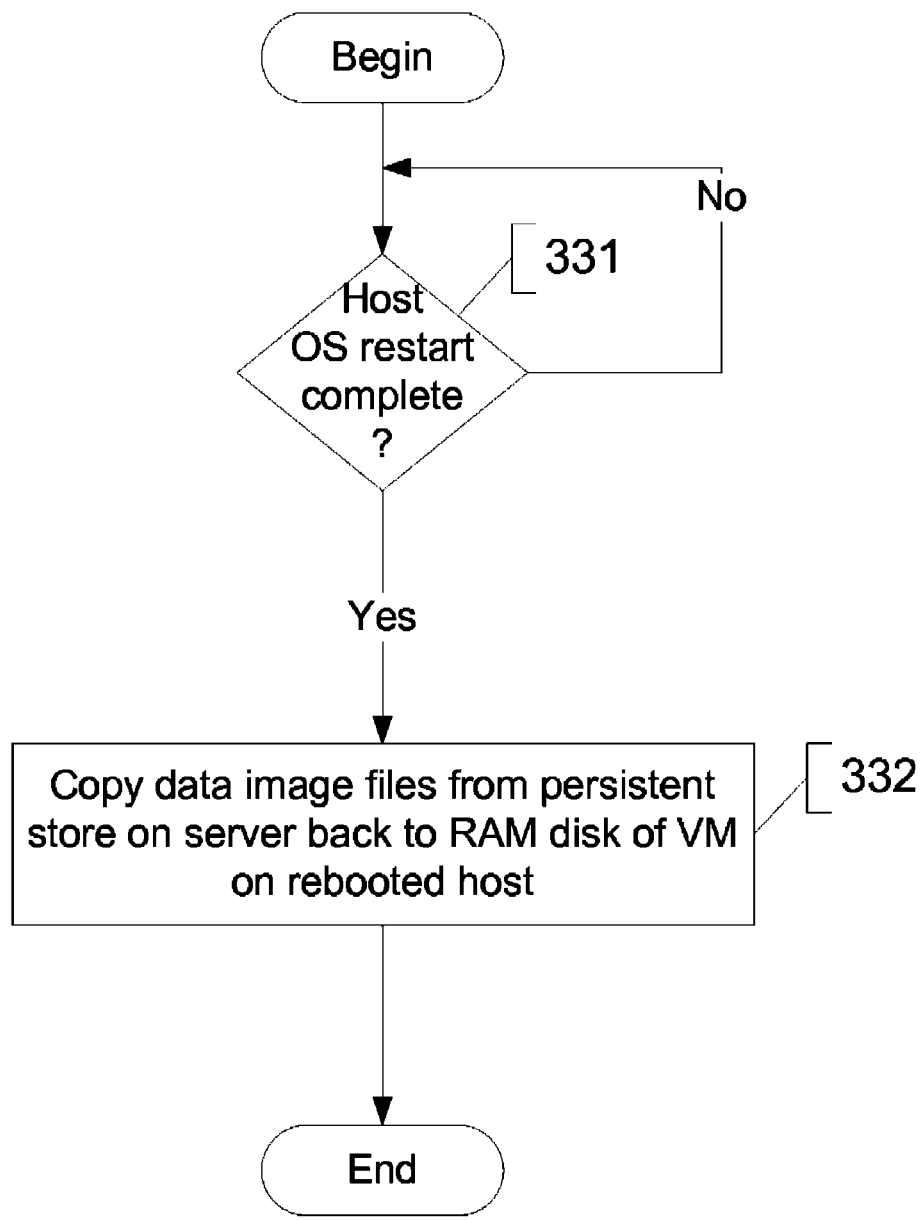

The technique introduced here also provides persistence in the event of a host OS shutdown or restart. FIG. 3D illustrates a process for accomplishing this. These steps may be implemented as modifications to the normal shutdown and restart processes of the host OS (e.g., Resource Configuration (RC) scripts in the case of a UNIX host). In response to detecting initiation of the host OS's shutdown or restart sequence (step 321) (which, as above, may be part of a restart sequence), the normal shutdown/restart sequence of the host OS is suspended at step 322. Then, at step 323 the data image files of each VM on that host are copied from RAM disk to the persistent store on the server, e.g., by using NFS. Once the copying is complete, the normal shutdown/restart sequence is resumed at step 324. When the host restart process has completed (step 332), the data image files are copied back from the server to RAM disk on that host, in the manner described above, as shown in FIG. 3E.

Figure 3F:
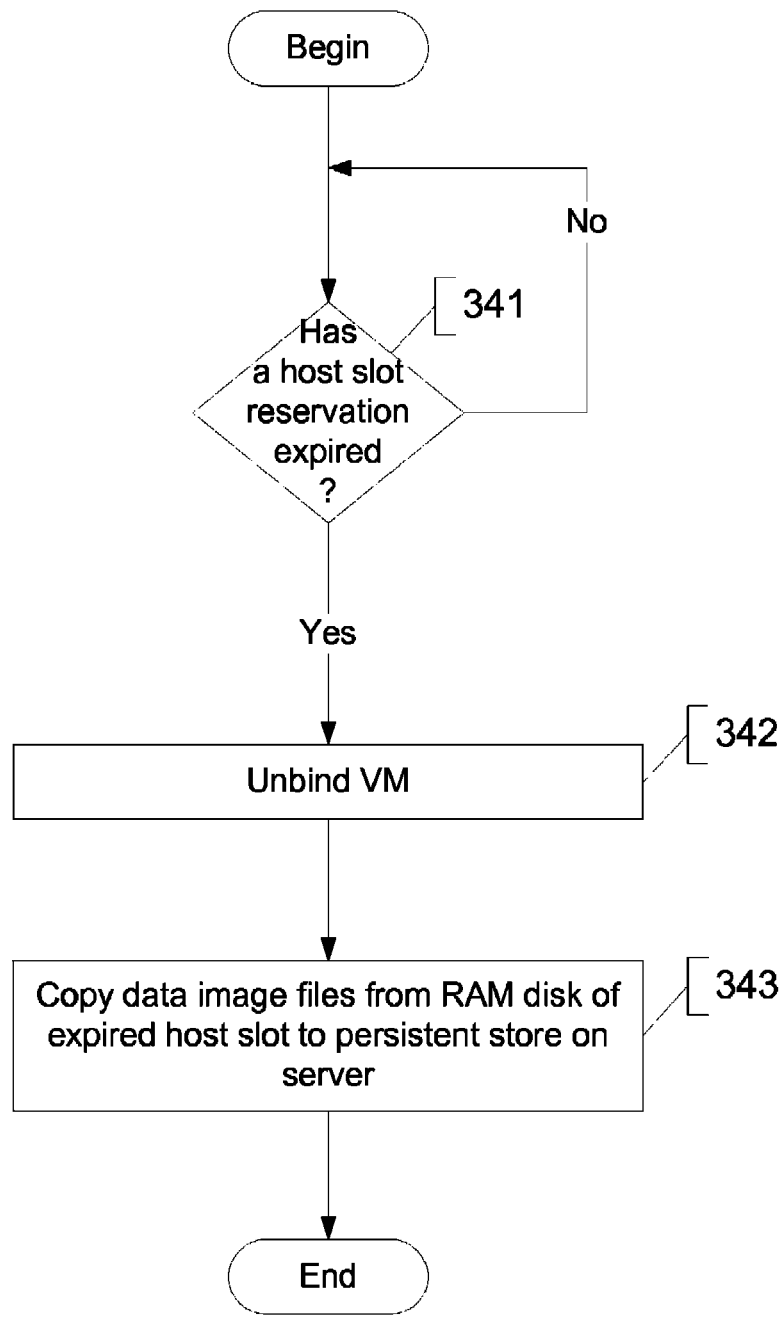
FIG. 3F illustrates a process of maintaining persistence across expiration of a reservation of a VM.

The technique introduced here further provides persistence in the event that a reservation of a host slot expires, as shown in FIG. 3F. In response to detecting expiration of a host slot reservation (step 341), and unbind operation is executed on the expired host slot at step 342 (the VM for that host slot is "unbound"), and the data image files of the VM are then copied at step 343 from RAM disk to the persistent store on the server, e.g., by using NFS. In one embodiment, an unbind operation involves unregistering the VM from the host system and modifying metadata of the VM to reflect its new state (unbound). The detecting expiration of the host slot reservation and the unbind operation can be performed by, for example, a resource management tool 27-1 that runs on the host system (see FIG. 2).

Figure 3G:
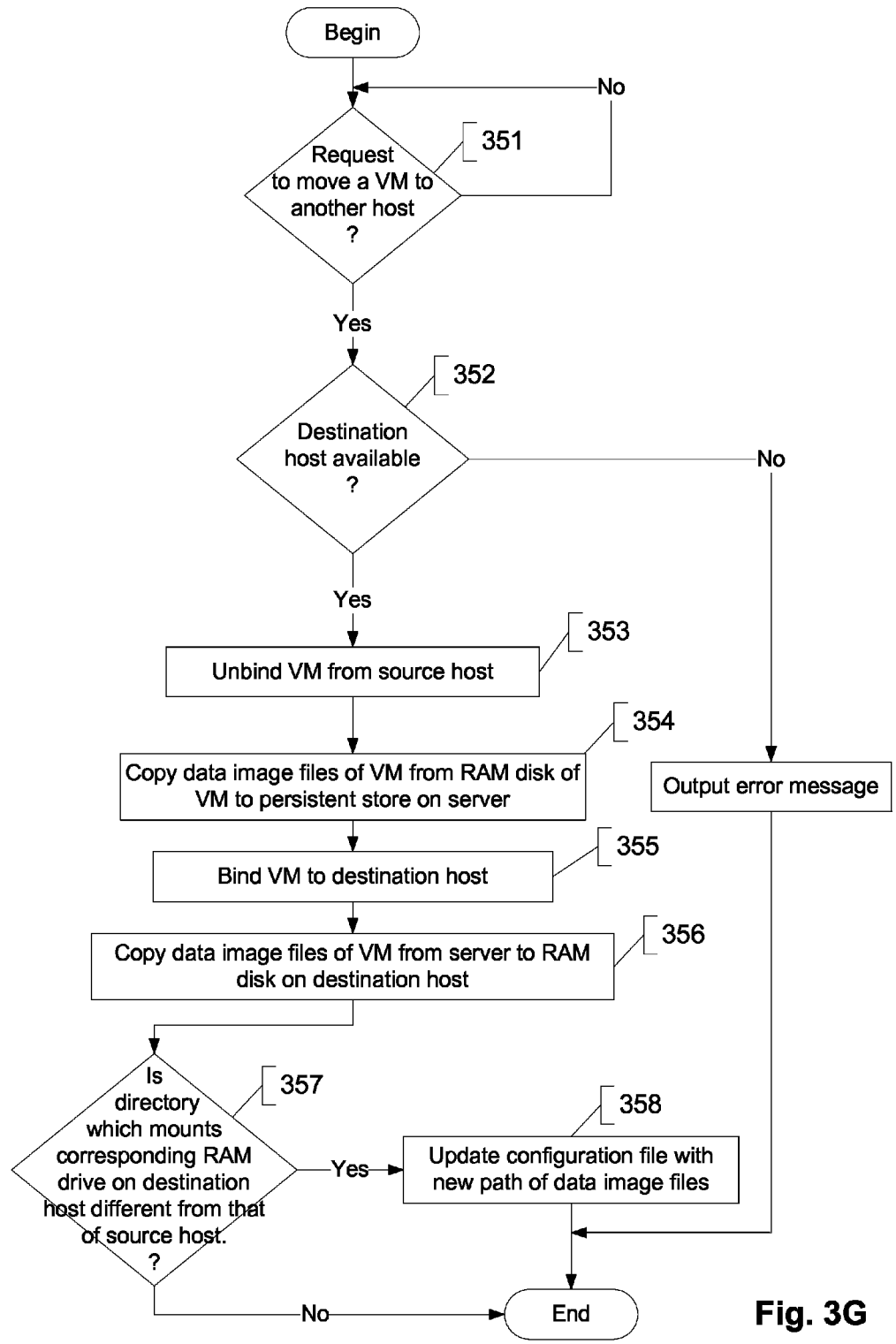
FIG. 3G illustrates a process of maintaining persistence across an inter-host VM migration.

The technique introduced here also is compatible with moving a VM from one host to another. A process for accomplishing this is shown in FIG. 3G. In response to detecting a request to move a VM from one host (source host) to another host (destination host) (step 351), the process first determines if the destination host is available at step 352. If the destination host is not available, the process outputs an error message at step 359.

If the destination host is available, then at step 353 the selected VM is unbound from the source host. As noted above, an unbind operation may involve unregistering the VM from the host system and modifying metadata of the VM to reflect its new state (unbound). This step can be initiated either by a human user or automatically by a resource management tool 27-1 running on the source host.

Next, at step 354 the data image files of that VM are copied from RAM disk on the source host to the persistent store on the server, e.g., using NFS. The VM is then bound to the destination host at step 355. This step can be initiated either by a human user or automatically by a resource management tool 27-2, running on the destination host. The data image files of the selected VM are then copied from the server to RAM disk on the destination host at step 356. If the directory which mounts the corresponding RAM drive on the destination host is different from the corresponding directory on the source host ((step 357), then at step 358 the configuration file of the selected VM is updated with the new path of the data image files.

Figure 4:
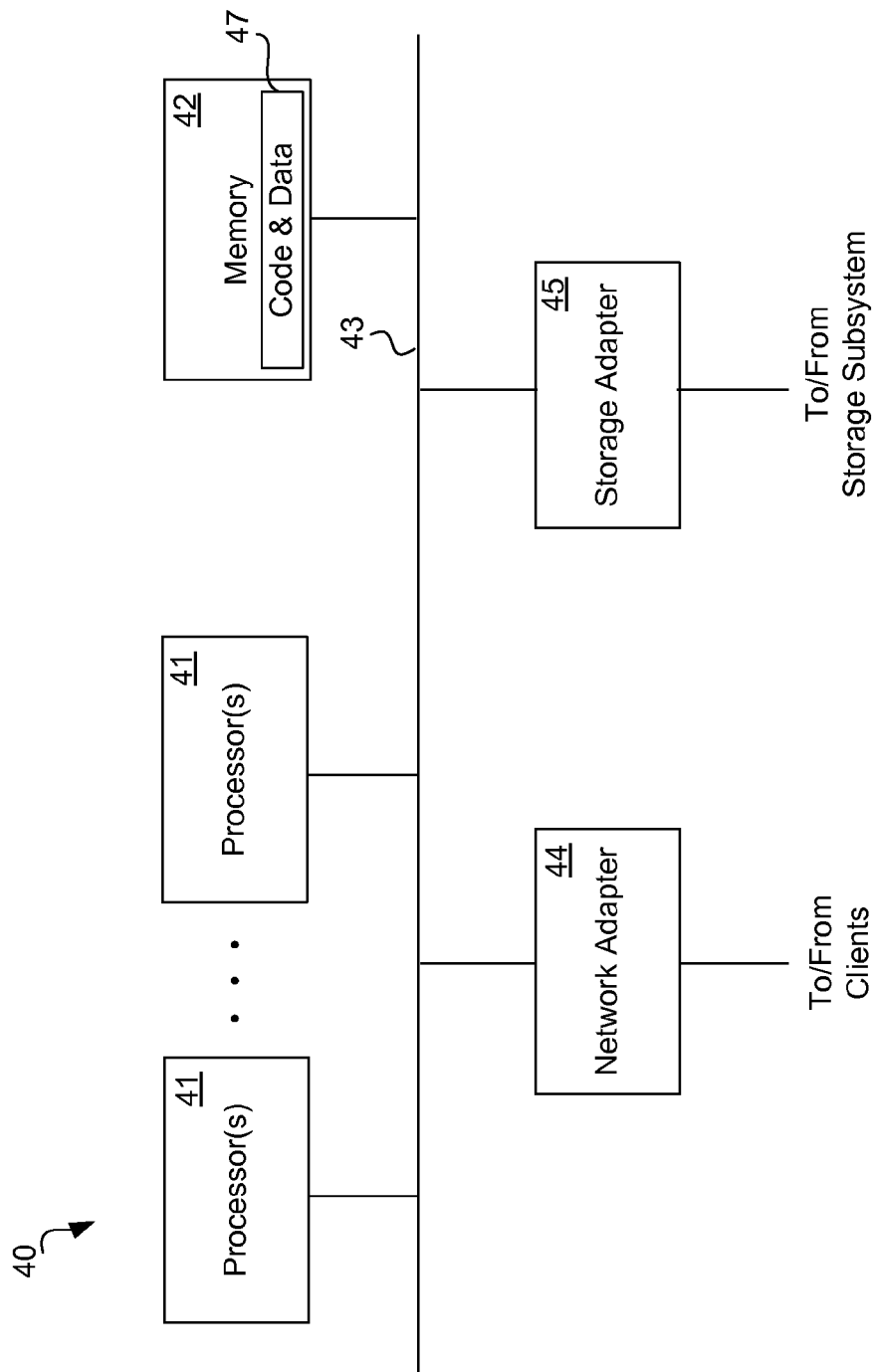
FIG. 4 is a high-level block diagram showing the hardware architecture of a processing system that can be used to implement any host or server described herein.

FIG. 4 is a high-level block diagram showing the hardware architecture of a physical processing system that can implement a host system or server such as described above. The processing system 40 in the illustrated embodiment includes one or more processors 41 and memory 42, each coupled to an interconnect 43. The interconnect 43 is an abstraction that represents any one or more separate physical buses, point-to-point connections, or both connected by appropriate bridges, adapters, or controllers. The interconnect 43, therefore, can include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 ("Firewire") bus.

The processor(s) 41 may be or include the CPUs of the processing system 40 and, thus, control the overall operation of the processing system 40. In certain embodiments, the processor(s) 41 accomplish this by executing software and/or firmware stored in memory, such as memory 42. Each processor 41 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 42 is or includes the main memory (working memory) of the processing system 40. The memory 42 represents any form of random access memory (RAM), read-only memory (ROM), flash memory (as discussed above), or the like, or a combination of such devices. In use, the memory 42 may contain, among other things, software and/or firmware code and data 47 to cause operations such as described above be performed.

Also connected to the processors 41 through the interconnect 43 are a network adapter 44 and a storage adapter 45. The network adapter 44 provides the processing system 40 with the ability to communicate with remote devices, such as clients, over a network and may be, for example, an Ethernet adapter or Fibre Channel adapter. The storage adapter 45 allows the processing system 40 to access an associated storage subsystem and may be, for example, a Fibre Channel adapter or a SCSI adapter. The processing system 40 may also, or alternatively, include one or more internal disks or other mass storage devices (not shown).

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
executing a guest operating system as a virtual machine on a first physical host coupled to a storage server via a network, the guest operating system including a network storage operating system, the virtual machine operating as a virtual storage server or a simulated storage server, the first physical host including a plurality of host slots, each of the host slots capable of executing a different virtual machine, the first physical host including random access memory (RAM);
using at least a portion of the RAM as a RAM drive to emulate a virtual, secondary, persistent mass storage device of the virtual machine controlled by the guest operating system, wherein using said at least a portion of the RAM as a RAM drive includes
creating a mount point for a host slot of the host slots that is executing the virtual machine, and
mounting the RAM drive on the created mount point;
using the RAM drive to store a data image file of the virtual machine, wherein the data image file represents the virtual, secondary, persistent mass storage device of the virtual storage server; and
responding, by a host operating system on the first physical host, to an event associated with an interruption in operation of the virtual machine, by causing contents of the RAM drive to be sent over the network to the storage server and storing persistently in the storage server.

2. A method as recited in claim 1, wherein the data image file is a virtual disk file.

3. A method as recited in claim 1, further comprising:
using said RAM drive as a virtual NVRAM of the storage server, by using said RAM drive to store a data image file that represents a virtual secondary storage based emulation of the NVRAM of the virtual storage server.

4. A method as recited in claim 3, wherein using said RAM drive as a virtual NVRAM of the virtual storage server comprises using the virtual NVRAM to log client write requests.

5. A method as recited in claim 1, further comprising using the RAM drive to store data that collectively represent the virtual machine.

6. A method as recited in claim 1, further comprising:
detecting a signal to reboot the first physical host; and
in response to the signal to reboot the first physical host, causing contents of the RAM drive to be sent over a network to a server and stored persistently as one or more datasets in the server before the first physical host can reboot.

7. A method as recited in claim 6, further comprising:
after the first physical host has rebooted, receiving said one or more datasets from the server and restoring the one or more datasets in the RAM of the first physical host as the RAM drive.

8. A method as recited in claim 1, further comprising:
detecting a request to move the virtual machine from the first physical host to a second physical host; and
in response to the request to move, causing contents of the RAM drive to be sent over a network to a server and stored persistently in the server as one or more datasets, the server coupled to communicate with the second physical host.

9. A method as recited in claim 8, further comprising:
sending said one or more datasets from the server to the second physical host and storing the one or more datasets in RAM of the second physical host as a RAM drive of the second physical host, the RAM drive of the second physical host being controlled by the virtual machine on the second physical host.

10. A method comprising:
executing a guest operating system as a virtual machine on a first physical host, the guest operating system including a network storage operating system, the virtual machine operating as a virtual storage server or a simulated storage server, the first physical host including a plurality of host slots, each of the host slots capable of executing a different virtual machine, the first physical host including random access memory (RAM);
using at least a portion of the RAM as a RAM drive to emulate a virtual, secondary, persistent mass storage device of the virtual machine controlled by the guest operating system, wherein using said at least a portion of the RAM as a RAM drive includes
creating a mount point for a host slot of the host slots that is executing the virtual machine, and
mounting the RAM drive on the created mount point;
using the RAM drive to store a data image file of the virtual machine, wherein the data image file represents the virtual, secondary, persistent mass storage device of the virtual storage server;
detecting a request to move the virtual machine from the first physical host to a second physical host; and
in response to the request to move the virtual machine from the first physical host to a second physical host,
unbinding the virtual machine from the first physical host;
causing contents of the RAM drive to be sent over a network to a server and stored persistently in the server as one or more datasets, the server coupled to communicate with the second physical host;
binding the virtual machine to the second physical host; and
sending said one or more datasets from the server to the second physical host and storing the one or more datasets in at least a portion of RAM of the second physical host, said at least a portion of RAM of the second physical host being used as a RAM drive controlled by the virtual machine on the second physical host.

11. A method as recited in claim 10, further comprising:
using said RAM drive, by the guest operating system, as a virtual NVRAM of a storage server, by using said RAM drive to store a data image file that represents a virtual disk based emulation of the NVRAM of the virtual storage server.

12. A method as recited in claim 11, wherein using said RAM drive as a virtual NVRAM of the virtual storage server comprises using the virtual NVRAM to log client write requests.

13. A method as recited in claim 10, further comprising using the RAM drive on the first physical host to store data that collectively represent the virtual machine on the first physical host.

14. A system comprising:
a server; and
a first physical host coupled to the server via a network, the first physical host including
a plurality of host slots, each of the host slots capable of executing a different virtual machine,
a host random access memory (RAM),
a guest operating system operable as a virtual machine on the first physical host, the guest operating system including a network storage operating system, the virtual machine operating as a virtual storage server or a simulated storage server, wherein in operation the guest operating system uses at least a portion of the host RAM as a RAM drive to emulate a virtual, secondary, persistent mass storage device of the virtual machine controlled by the guest operating system, wherein using said at least a portion of the host RAM as a RAM drive includes
creating a mount point for a host slot of the host slots that is executing the virtual machine, and
mounting the RAM drive on the created mount point, and
wherein the quest operating system further uses the RAM drive to store a data image file of the virtual machine, the data image file representing the virtual, secondary, persistent mass storage device of the virtual storage server, and
a host operating system configured to respond to an event associated with an interruption in operation of the virtual machine, by causing contents of the RAM drive to be sent over the network to the server and stored persistently in the server.

15. A system as recited in claim 14, wherein the server is a Network File Server (NFS) server and the first physical host further comprises an NFS client.

16. A system as recited in claim 14, wherein the RAM drive is used to store virtual disk files of the virtual machine.

17. A system as recited in claim 16, wherein the RAM drive is used as a virtual NVRAM of a storage server, by using said RAM drive to store a data image file that represents a virtual secondary, storage based emulation of the NVRAM of the virtual storage server.

18. A system as recited in claim 17, wherein the network storage operating system logs write requests received from a storage client in the virtual NVRAM.

19. A system as recited in claim 14, wherein the RAM drive is used to store data that collectively represent the virtual machine.

20. A system as recited in claim 14, wherein the first physical host further comprises a module configured to:
detect a signal to reboot; and
in response to the signal to reboot, cause contents of the RAM drive to be sent over a network to a server and stored persistently as one or more datasets in the server before the first physical host can reboot.

21. A system as recited in claim 20, wherein the module is further configured to:
after the first physical host has rebooted, receive said one or more datasets from the server and restoring the one or more datasets in the RAM of the first physical host as the RAM drive.

22. A system as recited in claim 14, wherein the first physical host further comprises a module configured to:
detect a request to move the virtual machine from the first physical host to a second physical host; and
in response to the request to move, cause contents of the RAM drive to be sent over a network to a server and stored persistently in the server.

* * * * *